United States Patent [19]
Goto

[11] Patent Number: 6,084,594
[45] Date of Patent: Jul. 4, 2000

[54] IMAGE PRESENTATION APPARATUS

[75] Inventor: Makoto Goto, Kawasaki, Japan

[73] Assignee: Fujitsu Limited, Kawasaki, Japan

[21] Appl. No.: 09/038,102

[22] Filed: Mar. 11, 1998

[30] Foreign Application Priority Data

Jun. 24, 1997 [JP] Japan ...................................... 9-167752

[51] Int. Cl.$^7$ .................................................. G09G 1/00
[52] U.S. Cl. .................................. 345/427; 345/7; 345/8; 345/9
[58] Field of Search .................. 345/427, 7, 8, 345/9

[56] References Cited

U.S. PATENT DOCUMENTS 5,815,411   9/1998   Ellenby et al. ........................ 345/9 X
5,841,439  11/1998   Pose et al. ............................. 345/418

OTHER PUBLICATIONS

Foley et al., "Computer Graphics: Principles and Practice", Second Edition, Addison–Wesley Publishing Company, pp. 229–242, Nov. 1993.

*Primary Examiner*—Mark K. Zimmerman
*Assistant Examiner*—Lance W. Sealey
*Attorney, Agent, or Firm*—Staas & Halsey, LLP.

[57] ABSTRACT

Using a mobile display having ordinary degree of resolution which is directly held by a user's hand or supported by a supporter, a three-dimensional virtual world is projected on a two-dimensional plane while varying the positional relations between the viewpoint and the image plane according to the position and orientation of the mobile display, and the resulting two-dimensional image is displayed on the mobile display and presented to the user.

14 Claims, 13 Drawing Sheets

MOVEMENT OF VIEWPOINT

LOOK AROUND

MANIPULATION OF OBJECT

—— : DISPLAY IN REAL WORLD
—— : PROJECTED PORTION IN VIRTUAL WORLD
------ : NOT PROJECTED PORTION IN VIRTUAL WORLD

IMAGE PRESENTATION APPARATUS

BACKGROUND OF THE INVENTION

1. Field of the Invention

The present invention relates to an image presentation apparatus for presenting two-dimensional (2-D) images using a display whose position and orientation are variable.

2. Description of the Prior Art

There have been devised various interactive user interface techniques by building up a virtual space of three-dimensional (3-D) world and showing as if the user were present inside a virtual world.

With respect to the technique for changing the position of the viewpoint and eye direction in the virtual world, there has been contrived "head fitting type display". This is to detect the position and orientation of the user's head in the real world, to project the virtual world on the image according to the detection result, and to present the image on the display set before the eyes of the user. Alternatively, in order to realize the similar effect in more simple manner, there has been reviewed a procedure to detect the position and orientation of the user's head along with the orientation of the eyeballs, to form images according to the detection result, and to display said images on a conventional "desk-top type display".

On the other hand, as a technique for manipulating the object in the virtual world, "data gloves" are contrived, This is a system to have the user put on gloves provided with the position and orientation sensors on the corresponding positions of joints to monitor the movements of hands and fingers, and to utilize the movements and shapes as input information data. By this device, manipulation can be performed on the objects in the virtual world in the sense equivalent to that in the real world. Alternatively, devised is a procedure wherein the user is caused to manipulate input means specifically designed to the position and the orientation (for example, 3-D mouse), the position and orientation thereof are detected, and the detection results are used as the input information. Furthermore, use of the conventional input methods such as keyboard, mouse, and the like is also practiced.

However, the procedures as described above involve the following problems. The "head fitting type display" has problematic points in complication of fitting and unfitting and discomfort during fitting, and it is not suited for frequent use or long time sustaining use. Also, as it covers the user's field of view, danger caused by an obstacle in the real world cannot be neglected. Furthermore, in order to provide sufficient image quality to simulate the whole field of view, the display of very high resolution is required, which is restrained by the calculation cost for creating the resolution of the display device and image formation. The procedure to form images in conformity with the position and orientation of the head along with the eyeball orientation and display on a "desk-top type display" gives restriction to the range of vision, and cannot be an effective method.

The "data gloves" system also involves problems in complication of fitting and unfitting and discomfort during fitting. The said method requires calculation one by one of the transmission of forces at the contact points between the hand and the object with respect to the individual object, and it requires high calculation cost. In the case of using the input means specified to the position and the orientation, manipulation must be made in a place other than the place where the image is displayed, so it cannot be referred to as an intuitive manipulation. The procedures using the conventional input methods including a keyboard, mouse, etc. result in no realistic manipulation because of the necessity to convey to the computer the user's intention by abstract expression such as input of coordinate amounts.

To construct an interactive interface based on the 3-D space by using a simple device has diversified applications. For example, in the virtual reality field, it is an essential technique to have intuitive spatial cognition and carry out interactive object manipulation in a virtual 3-D world, and it is desired to realize such technique in a small scale system such as a mobile terminal. Further, if it becomes possible to extract accurately the information obtained from the complicated 3-D structure without necessitating to learn special skills, such technique can be applied to the field such as image analysis for medical use. In view of such a situation, it is a significant task to construct a spatial interface which can be easily used and is characteristic of natural and effective space formation and response to motion.

BRIEF SUMMARY OF THE INVENTION

An object of the present invention is to provide an image presentation apparatus which is an intuitive and spatial user interface, which is entirely free from the necessity to fit the devices such as sensor or display to the user's body or necessity to use a display of high resolution.

According to the image presentation apparatus of the invention, using a mobile display having ordinary degree of resolution which is directly held by a user's hand or supported by a supporter, a 3-D virtual world is projected on a 2-D image while varying the positional relations between the viewpoint and the image plane according to the position and orientation of the mobile display, and the resulting 2-D image is displayed on said mobile display.

In the present invention, due to such construction that a 3-D virtual world is projected on a 2-D image while varying the positional relations between the viewpoint and the image plane according to the position and orientation of the mobile display, and the resulting 2-D image is presented, so that there can be provided an intuitive spatial user interface which is free from the necessity to have the user's body fitted with devices such as a sensor, display, etc. and the necessity to use a high resolution display.

In the case of keeping the position of the viewpoint constant, the condition to look around the virtual world from the fixed point can be simulated.

In the case of keeping the relative positional relations between the position of the viewpoint and the position and orientation of the image plane constant, the viewpoint can be changed with fixation of size and shape of the attentive region in the visual space.

In the case of detecting the position and orientation of the mobile display and determining the position of the viewpoint and the position and orientation of the image plane according to the result of detection, it is possible to present images conforming to the user's direct change of the position and orientation of the mobile display.

In the case of determining the position of the viewpoint and the position and orientation of the image plane according to the control signal in controlling the position and orientation of the mobile display, it is possible for the user to change optionally the position and orientation of the mobile display, and to change the position and orientation of the mobile display according to the story held by the virtual world.

In the case of determining the position of the viewpoint and the position and orientation of the image plane according to the position and orientation of the set mobile display, the user can set the position and orientation of the mobile display in tune with the movement of the mobile display.

In the case of presenting the images to the user on board a vehicle by a mobile display, simulation on board a vehicle in a virtual world can be provided.

In the case of selecting a specific object in a virtual world and determining its position and orientation, the position and orientation of the specified virtual object can be changed by moving the mobile display.

The above and further objects and features of the invention will more fully be apparent from the following detailed description with accompanying drawings.

DETAILED DESCRIPTION OF THE INVENTION

FIGS. 1A–1D are the schematic views to illustrate the use condition of the image presentation apparatus of the present invention. In FIGS. 1A–1D, the mobile display in the real world is shown in a black frame, the projected portion in the virtual world is shown in solid lines, and not projected portion is shown in dotted lines. When the image presentation apparatus of the present invention is used, it becomes possible to practice for example "look around", "movement of viewpoint", and "manipulation of an object" in the virtual world.

Figure 1A:
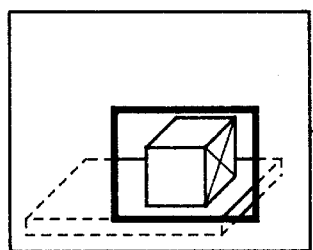
FIGS. 1A–1D are the views to illustrate the outline of the present invention.
Figure 1C:
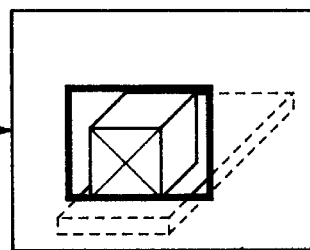
Figure 1B:
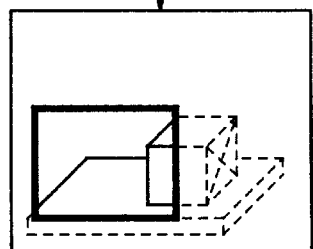
Figure 1D:
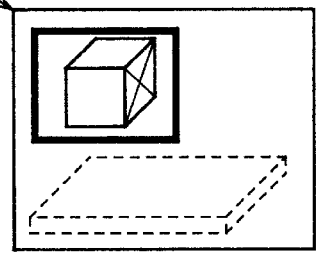

First, in the condition of FIG. 1A, according to the position and orientation of mobile display, the 2-D image obtained by projecting the 3-D virtual world is presented on the mobile display. From such a condition, assuming that the position of the viewpoint is fixed, when the position and orientation of the image plane are varied in tune with the movement of the mobile display, it becomes possible to realize "look around" as if the virtual world were viewed through the mobile display (FIG. 1B). Also, when the position of the viewpoint is varied in tune with the movement of the mobile display from the condition of FIG. 1A, "movement of viewpoint" can be practiced in the 3-D virtual world (FIG. 1C), Further, the position and orientation of the specific object in the virtual world can be moved in tune with the movement of the mobile display to realize "manipulation of object" (FIG. 1D). As described above, in the image presentation apparatus of the present invention, using a mobile display, while varying the position and orientation of the image plane, the position of the viewpoint and/or the position and orientation of the object in tune with the movement of the mobile display, the 3-D virtual world is projected to obtain a 2-D image, which is displayed on the mobile display.

The present invention is based on the visual psychological theory as stated below.

(Theory of information pickup)

In the human visual system, invariable factors such as stereostructure of an object are said to be extracted from the flowing patterns of the ambient optic array in the environment arising from "look around" and "movement of viewpoint". That is to say, it is considered that a person acquires the momentarily changing the position and orientation of the eyeballs based on the muscular contraction movement for moving eyeballs, head, body trunk, moment of inertia exerted to the body, etc., and in accordance with the resulting motion picture image obtained on the retinas, builds up in the head a 3-D internal symbol of an object.

In the present invention, by contriving not to interrupt natural changes of the position and orientation of the eyeballs when the user accepts the visual information of virtual world, a display system which provides enriched realistic feeling is realized. This point has been considered in the conventional virtual reality technique using a "head fitting type display" alike.

(Affordance)

When it is possible for a certain person (A) to carry out a certain manipulation (C) to a certain object (B), it can be called that "an object (B) affords a manipulation (C) to a person (A)" or "the manipulation (C) is an affordance of the object (B) to the person (A)". It can be commented also that the actual manipulation (C) to an object (B) by a person (A) is that "a person (A) perceives the affordance of the manipulation (C) from the object (B) and utilizes said affordance".

In the present invention, the affordance of an object in the virtual world is made easier to utilize by bringing the manipulation of an object to afford to the user in the virtual world into agreement with the manipulation of the mobile display to afford to the user in the real world as far as possible. What is important for a person to manipulate an object is what affordance the said person is to utilize, and the individual force to work between the finger and the surface of the object is not so important. In such respect, the conventional virtual reality technique using the "data gloves" which calculates the forces one by one expends the calculation cost beyond necessity. In the present invention, by focusing the practicable manipulations to the basic manipulations of parallel movement, rotary movement, etc., sufficiently interactive manipulation is made possible with the limited calculation cost. In addition, by making the mobile display itself the object of manipulation, visual feedback can be given in natural form to consider as to whether pertinent operation is carried out or not.

(Visual spatial attention)

Man is considered not to take in uniformly all the information in the field of vision but to preferentially accept only a part of information on the retinal image by selection, in order to utilize the limited cognitive information to the maximum extent (theory of limited capacity of attention). It can be commented that, in manipulating an object, to chase the movement of the object with eyes, man directs the attention to the object (active attention), and when an attention is drawn to an object, the attention is directed to the object (passive attention). In the present invention, without simulating the whole visual field as observed in the conventional technique using "head fitting type display", only the region to which the attention is directed is simulated, so that even when a display having an ordinary resolution level is used, the feeling of actual presence is not marred.

Figure 2:
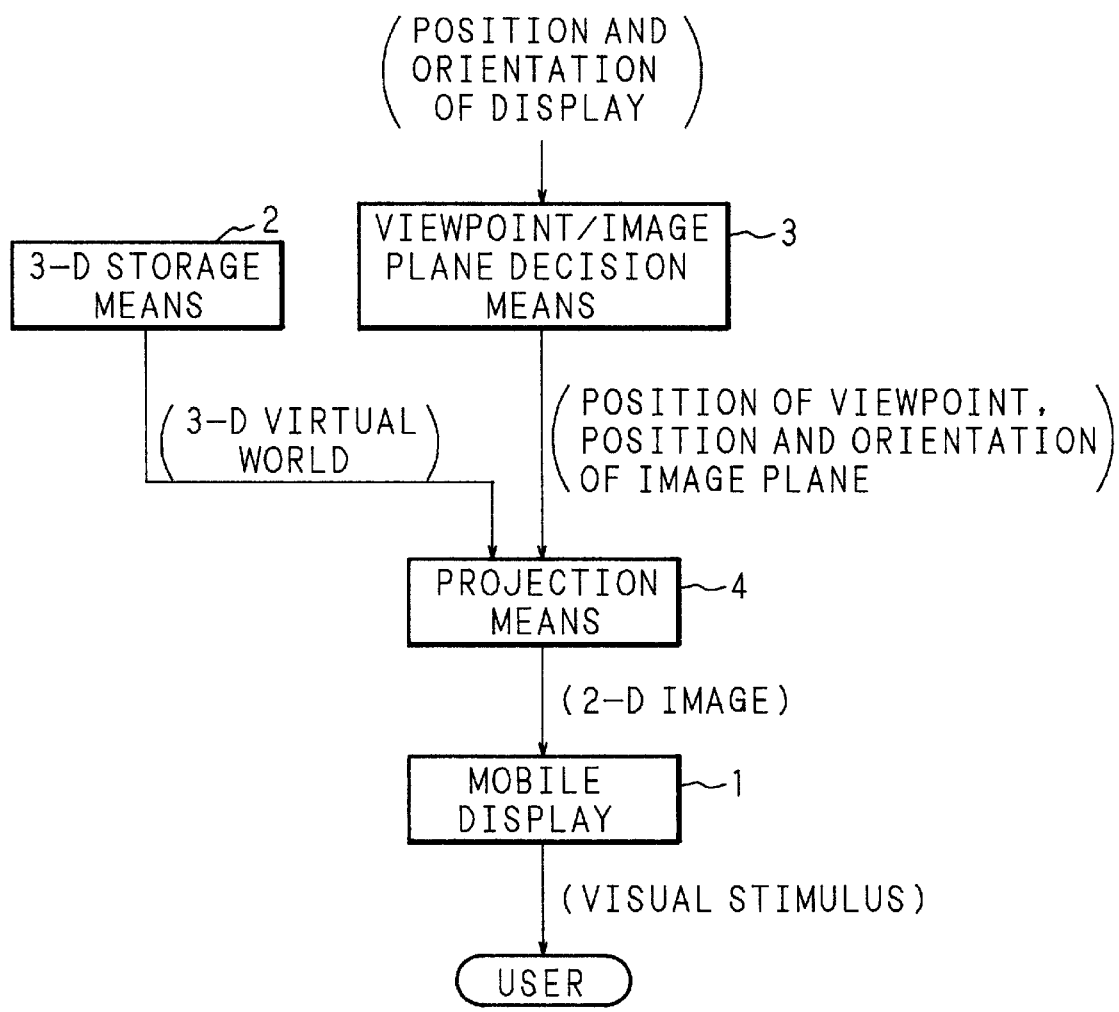
FIG. 2 is a block diagram to show the basic constitution of an image presentation apparatus of the present invention.

FIG. 2 is a block diagram showing the basic constitution of the image presentation apparatus of the present invention. This image presentation apparatus comprises a mobile display 1, 3-D storage means 2, viewpoint/image plane decision means 3, and projection means 4. The mobile display 1 is held by a hand of the user or supported on a support member, and its position and orientation are variable. The 3-D storage means 2 store the image of the 3-D virtual world. The viewpoint/image plane decision means 3 determines the position of the viewpoint and the position and orientation of the image plane in the projection means 4 according to the position and orientation of the mobile display 1, and outputs the determined parameters (the position of the viewpoint and the position and orientation of the image plane) to the projection means 4. The projection means 4 project the 3-D virtual world image stored in the 3-D storage means 2 on the 2-D image based on the parameter determined by the viewpoint/image plane decision means 3, and the 2-D image is presented on the mobile display 1.

Figure 3:
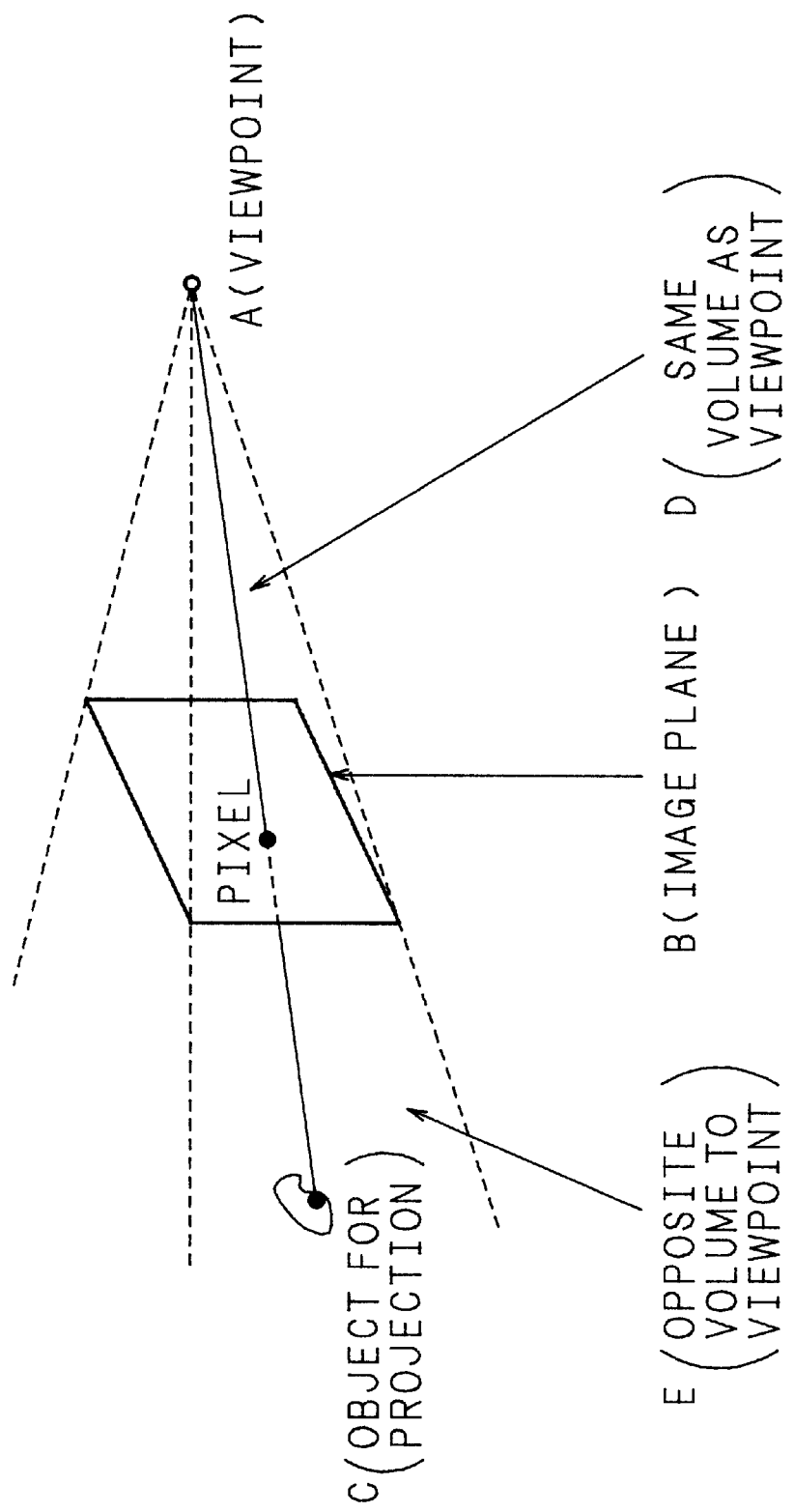
FIG. 3 is a schematic view to show the projection concept of the projection means.

The concept of the projection means 4 in the 3-D virtual world is shown in FIG. 3. In FIG. 3, A and B are the decided viewpoint and image plane respectively, and C denotes an object for projection. A point on the object C is being projected to a certain pixel on the image plane B, because it is the substantial point nearest to the viewpoint A on the viewing line (the straight line connecting the pixel and the viewpoint A) within the projection objective region, which consists of one or more out of three regions—the volume D which is on the same volume as the viewpoint A from the image plane B, the opposite volume E which is on the opposite side to the viewpoint A from the image plane B, and the image plane B itself.

By forming the constitution as above, it becomes possible to project the 3-D virtual world on the 2-D image while varying the positional relations between the viewpoint A and the image plane B according to the position and orientation of the mobile display 1, present the resulting 2-D image on a mobile display 1 and offer to the user. Since the 2-D image which varies according to the position and orientation of the mobile display 1 is presented, the user can recognize the 3-D virtual world on the 2-D screen quite simply and easily, without fitting any device such as a sensor or display on the body.

By the way, in the case of keeping the position of the viewpoint decided by the viewpoint/image plane decision means 3 constant, as described before, a 3-D virtual world can be seen through the mobile display 1 (transition from FIG. 1A to FIG. 1B), by which the condition to look around from the fixed point in the 3-D virtual world can be simulated.

Further, in the case of keeping the relative positional relations between the position of the viewpoint and the position and orientation of the image plane constant in deciding the parameter by the viewpoint/image plane decision means 3, as described above, movement of the viewpoint can be made in the 3-D virtual world (transition from FIG. 1A to FIG. 1C), and the condition to change the viewpoint while fixing the size and shape of the attentive region in the visual space can be simulated.

Figure 4:
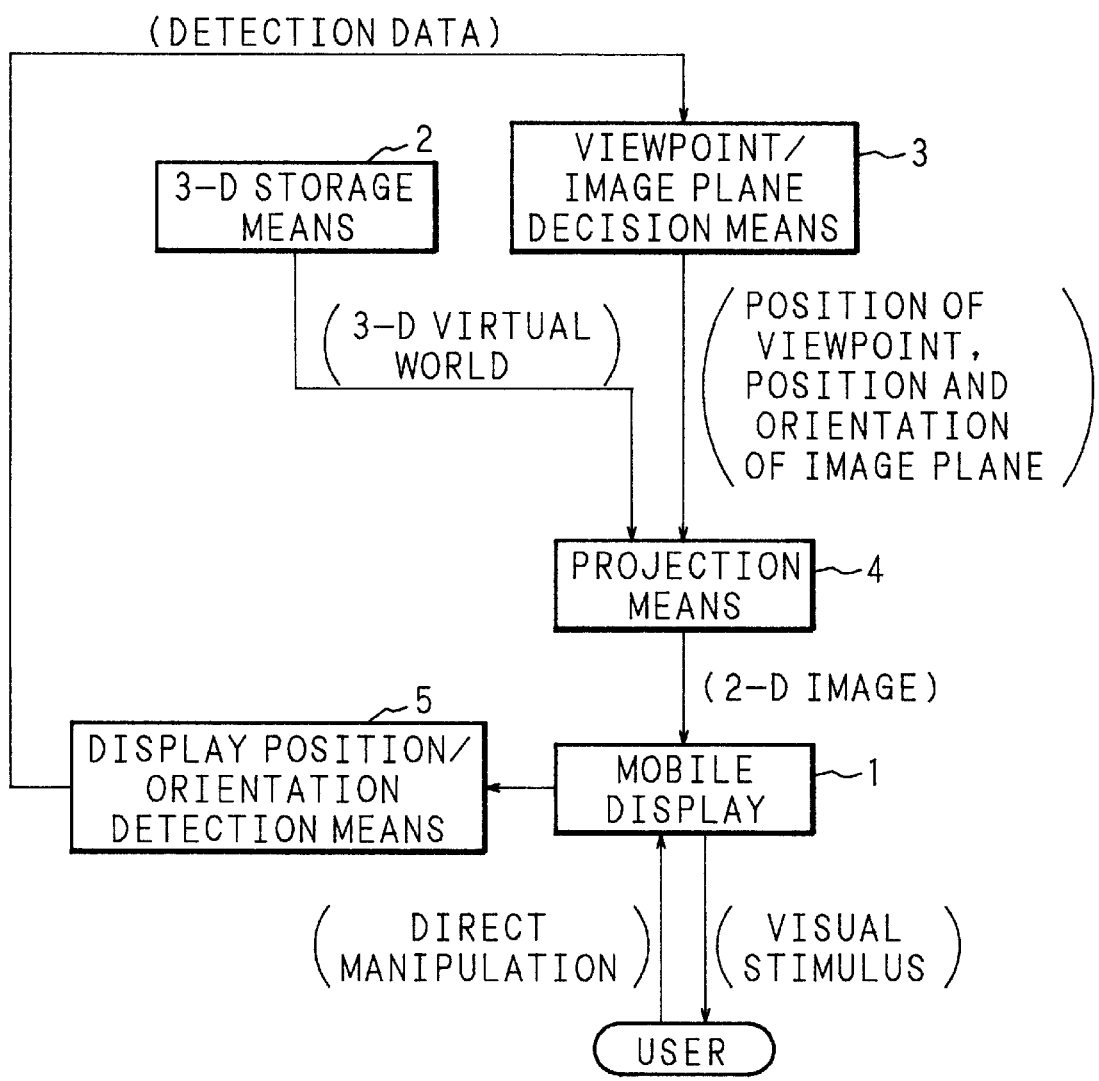
FIG. 4 is a block diagram to show the basic constitution of another image presentation apparatus of the present invention.

FIG. 4 is a block diagram showing the basic constitution of other image presentation apparatus of the present invention. This image presentation apparatus comprises a mobile display 1, 3-D storage means 2, viewpoint/image plane decision means 3, and projection means 4 which are similar to those of FIG. 2, along with display position/orientation detection means 5 for detecting the position and orientation of the mobile display 1. The viewpoint/image plane decision means 3 decides the position of the viewpoint and the position and orientation of the image plane at the time of the projection by the projection means 4 according to the position and orientation of the mobile display 1 inputted by the display position/orientation detection means 5. Accordingly, for example, when the user manipulates the mobile display 1 held by a hand, the user's manipulation to the mobile display 1 (direct change of the position and orientation to the mobile display 1) is reflected on the position of the viewpoint and the position and orientation of the image plane, by which it becomes possible to make fine adjustment of the position and orientation of the presented image.

With respect to the display position/orientation detection means 5, all the detection means can be used with which the position and the orientation can be detected, including the detection means using a magnetic sensor or a supersonic wave sensor, a detection means using a multijoint arm device furnished with a function to detect the angle of each joint of the mobile display 1, means for renewing the angle, the position, velocity, etc. stored in the internal memory according to the angular velocity, acceleration measured by a gyroscope, an accelerometer gauge, etc.

Figure 5:
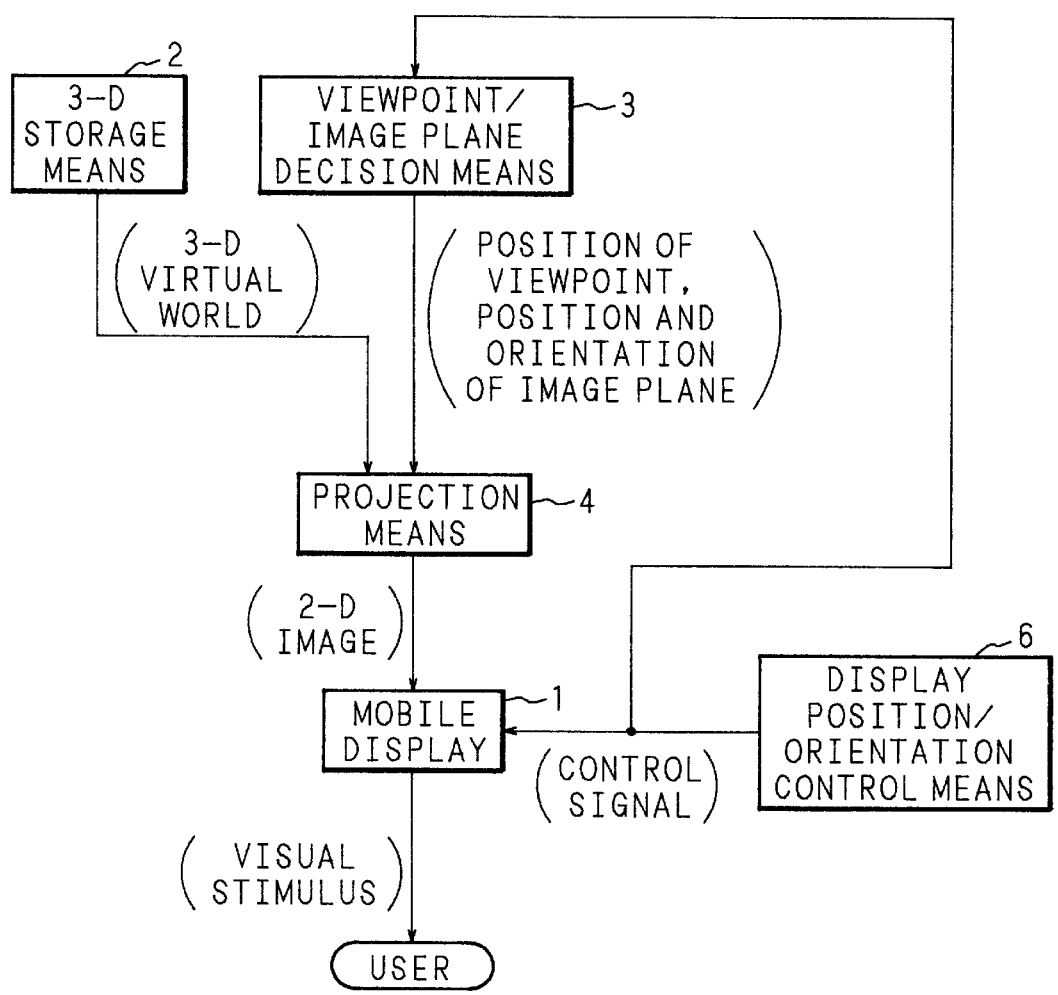
FIG. 5 is a block diagram to show the basic constitution of further image presentation apparatus of the present invention.

FIG. 5 is a block diagram showing the basic constitution of further image presentation apparatus of the invention. This image presentation apparatus comprises a mobile display 1, 3-D storage means 2, viewpoint/image plane decision means 3, and projection means 4 which are similar to those of FIG. 2, along with display position/orientation control means 6 for controlling the position and orientation of the mobile display 1. A control signal for controlling the position and orientation of the mobile display 1 is sent from the display position/orientation control means 6 to the viewpoint/image plane decision means 3, and according to the control signal, the viewpoint/image plane decision means 3 decides the position of the viewpoint and the position and orientation of the image plane at the time of the projection by the projection means 4. Accordingly, for example, when an image provider other than the user moves the mobile display 1 in tune with the video story of the 3-D virtual world, the position and orientation of the viewpoint of the image accepting person who is the user can be induced to the optimum ones.

Figure 6:
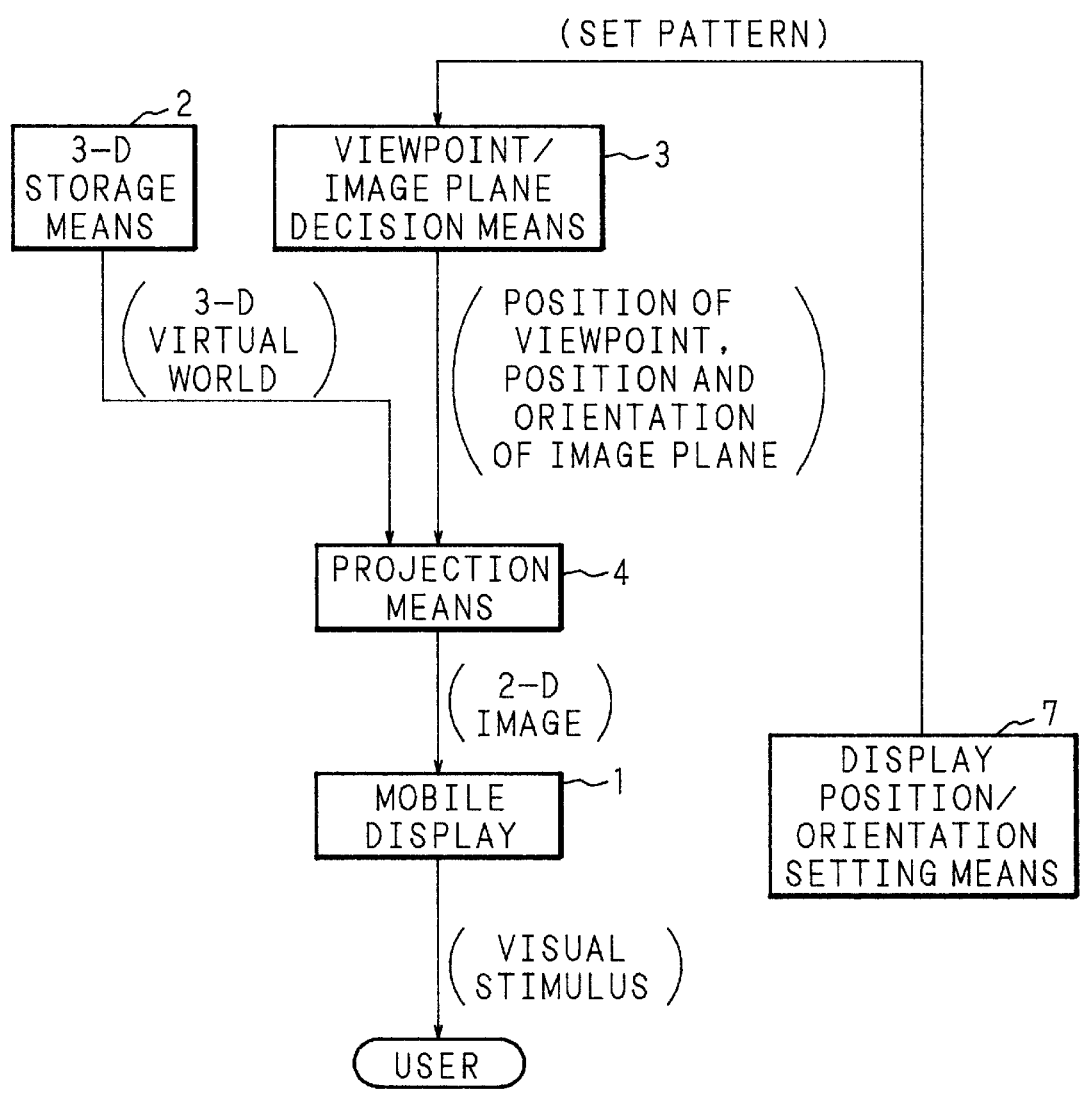
FIG. 6 is a block diagram to show the basic constitution of further image presentation apparatus of the present invention.

FIG. 6 is a block diagram showing the basic constitution of further image presentation apparatus of the invention. This image presentation apparatus comprises a mobile display 1, 3-D storage means 2, viewpoint/image plane decision means 3, and projection means 4 which are similar to those of FIG. 2, along with display position/orientation setting means 7 for setting the position and orientation of the mobile display 1. A set pattern for setting the position and orientation of the mobile display 1 is sent from the display position/orientation setting means 7 to the viewpoint/image plane decision means 3, and according to the set pattern, the viewpoint/image plane decision means 3 decides the position of the viewpoint and the position and orientation of the image plane at the time of the projection by the projection means 4. Accordingly, for example, when a mobile display 1 is set in a moving object with which a moving pattern is set, the image which varies with the movement of the moving object can be presented to the user by the mobile display 1.

Figure 7:
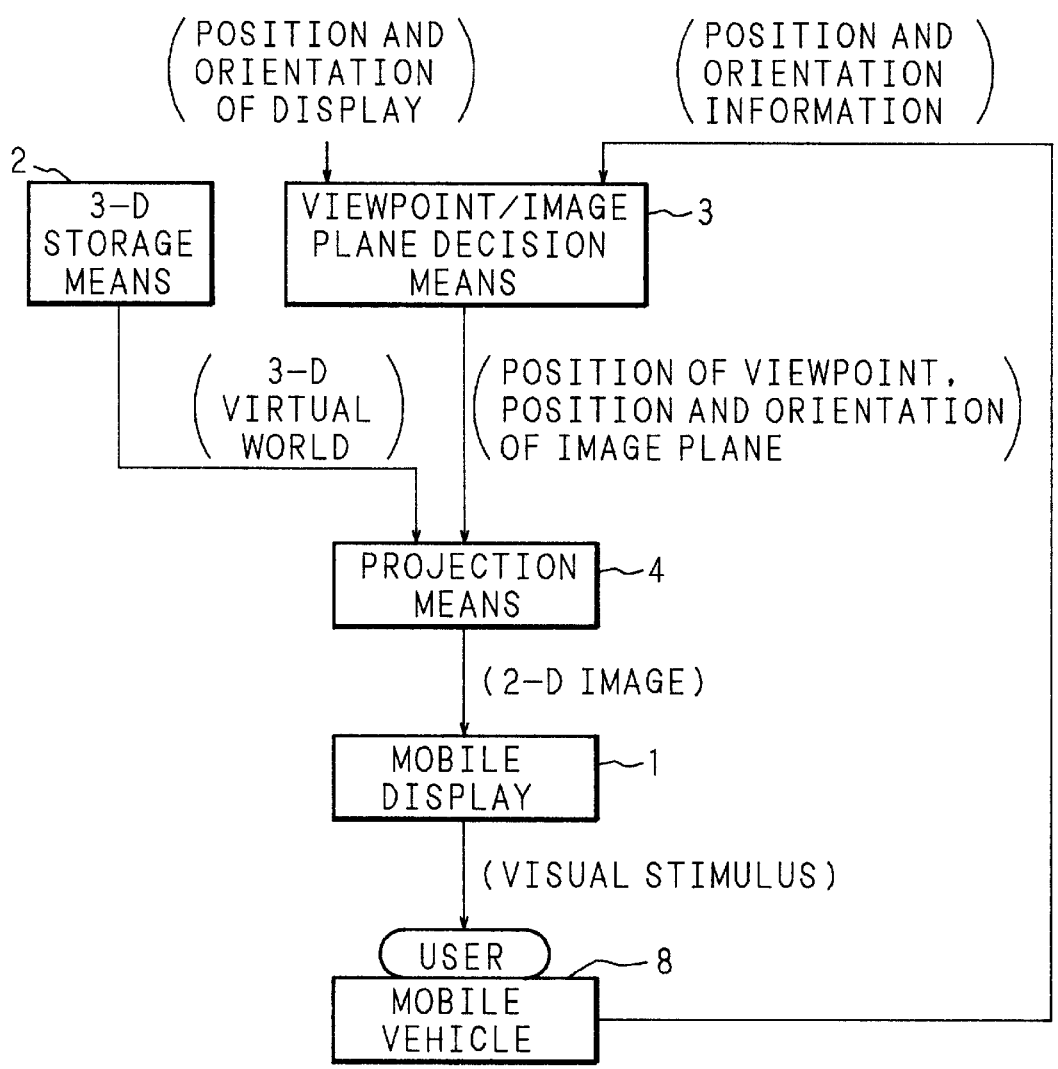
FIG. 7 is a block diagram to show the basic constitution of still further image presentation apparatus of the present invention.

FIG. 7 is a block diagram showing the basic constitution of further image presentation apparatus of the invention. This image presentation apparatus comprises a mobile display 1, 3-D storage means 2, viewpoint/image plane decision means 3, and projection means 4 which are similar to those of FIG. 2, along with a mobile vehicle 8 to accommodate the user. The information on the position and orientation of the mobile vehicle 8 is sent to the viewpoint/image plane decision means 3, whereupon the viewpoint/image plane decision means 3 decides the position of the viewpoint and the position and orientation of the image plane at the time of the projection by the projection means 4, referring to the information on not only the position and orientation of the mobile display 1 but also on the position and orientation of the mobile vehicle 8. Accordingly, for example, the condition of the user being on board the vehicle in the 3-D virtual world can be simulated.

Figure 8:
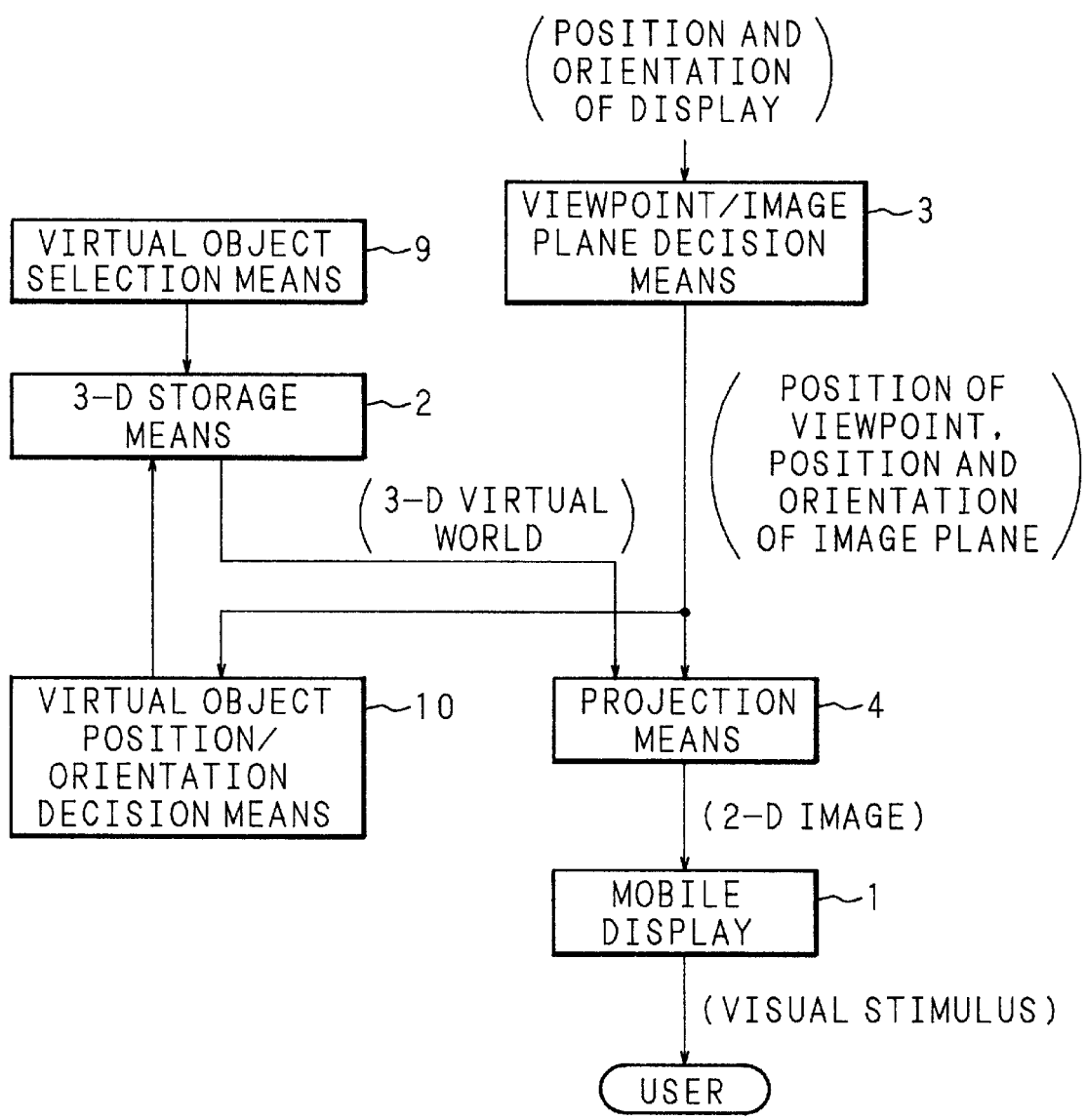
FIG. 8 is a block diagram to show the basic constitution of still further image presentation apparatus of the present invention.

FIG. 8 is a block diagram showing the basic constitution of further image presentation apparatus of the invention. This image presentation apparatus comprises a mobile display 1, 3-D storage means 2, viewpoint/image plane decision means 3, and projection means 4 which are similar to those of FIG. 2, along with virtual object selection means 9 for selecting the specific virtual object in the 3-D virtual world, and virtual object position/orientation decision means 10 for deciding the position and orientation of a specified virtual object according to the position of the viewpoint and the position and orientation of the image plane decided by the viewpoint/image plane decision means 3.

When the specified virtual object is selected by the virtual object selection means 9 out of the plural virtual objects constituting the 3-D world, the selection information is sent to the 3-D storage means 2. Also, the position and orientation of the selected specified virtual object is decided by the virtual object position/orientation decision means 10 according to the position of the viewpoint and the position and orientation of the image plane decided by the viewpoint/image plane decision means 3, and its position/orientation information is sent to the 3-D storage means 2. And, in reflection of these data of information, the 3-D virtual world of the 3-D storage means 2 is projected on the 2-D image by the projection means 4. As a result, in tune with the movement of the mobile display 1, the specified virtual object is also to move, so that as described above, manipulation of an object in the 3-D virtual world can be carried out (transition from FIG. 1A to FIG. 1D), and by the user's operation of the mobile display 1, the condition of changing the position and orientation of the object of 3-D virtual world can be simulated.

Hereinafter, the embodiments of the invention are concretely explained.
(Embodiment 1)

Figure 9:
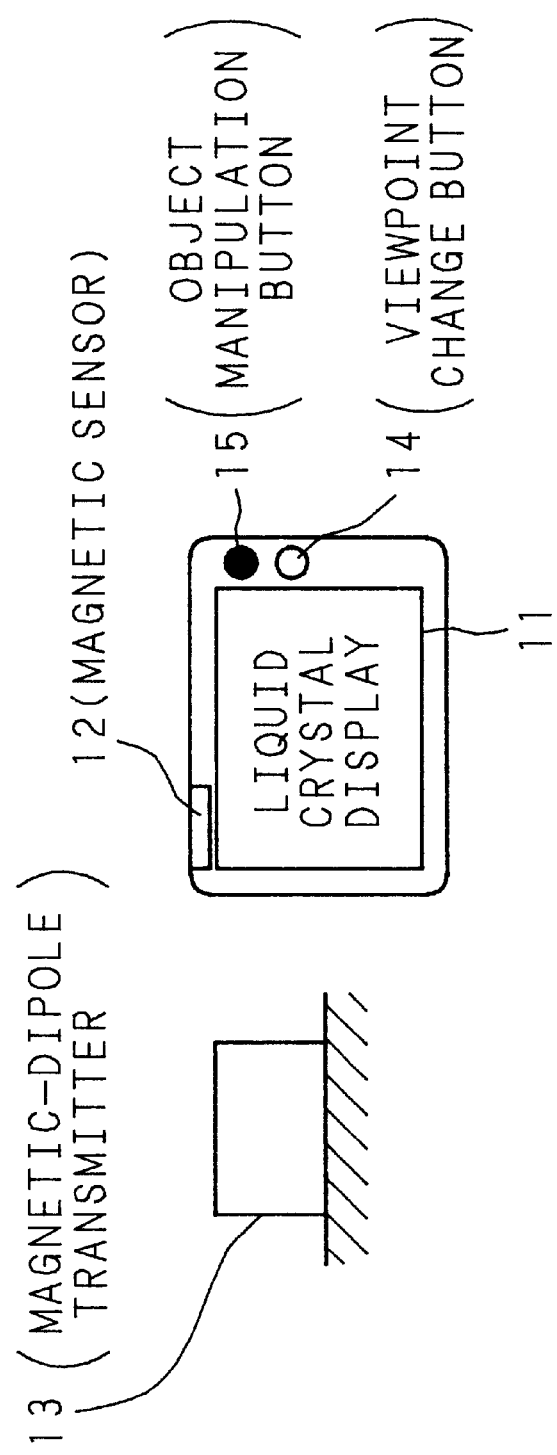
FIG. 9 is a front elevation of a miniature virtual reality terminal according to the present invention.

FIG. 9 is a front elevation of a miniature virtual reality terminal as an example of the present invention in which a 3-D virtual world is presented in a 2-D image. As a mobile display 1, a plane type liquid crystal display 11 having a size of an extent that the user can manipulate freely by hand is used. As the display position/orientation detection means 5, used are a magnetic sensor 12 set at the virtual reality terminal thereof and a magnetic-dipole transmitter 13 fixed to a point in the real world, and the position and orientation of the liquid crystal display 11 (relative position and orientation to the magnetic-dipole transmitter 13) are to be detected based on the detection result of the magnetism from the magnetic-dispole transmitter 13 with the magnetic sensor 12. Further, to the virtual reality terminal, the viewpoint change button 14 and the object manipulation button 15 are set which are to be later described, as auxiliary input means.

The projection objective regions in the projection means 4 cover all of the regions including the same volume as the viewpoint, the opposite volume to the viewpoint, and the image plane itself (Ref. FIG. 3). Also, in consideration of the hardware characteristics of the liquid crystal display 11, brightness conversion of the image is made according to the position of the viewpoint and the position and orientation of image plane. That is to say, the display plane of the liquid crystal display 11 which is seen darker when viewed obliquely is adjusted to be seen slightly brighter. In the viewpoint/image plane decision means 3, the position and orientation of the image plane are made equal to the position and orientation of the liquid crystal display 11 in the real world.

When the viewpoint change button 14 is not pressed, the position of the viewpoint is kept constant. The position of the constant viewpoint in this case is a position distant by a predetermined amount (approx. several scores of cm) in front of the liquid crystal display 11 at the time of the start of use of the virtual reality terminal, and at any other time it is the position of the viewpoint at the time when the viewpoint change button 14 is finally released. To such a constant position of the viewpoint, the user fixes his eyes (viewpoint). When the user moves the liquid crystal display 11 to the position to which attention is desired to be directed while keeping the own viewpoint unmoved under the condition of the viewpoint change button 14 untouched, the user can simulate to look around the virtual world of the related part through the peep hole.

When the viewpoint change button 14 is depressed, setting is made to keep the relative positional relations between the position of the viewpoint and the position and orientation of the image plane constant. The user can change the position of the viewpoint in the virtual world by moving the liquid crystal display 11 to a position to which the attention is desired to be directed, while fixing the relative positional relationship between the liquid crystal display 11 and the own viewpoint under the condition of the viewpoint change button 14 being depressed.

When the object manipulation button 15 is pressed, the virtual object over which the pointer displayed on the fixed position on the liquid crystal display 11 is laid is selected by the virtual object selection means 9. The virtual object position/orientation decision means 10 projects the preset specific centroid of the virtual object on an image plane, and when the point on the projected image plane is taken as the centroid projection point, the position and orientation of the virtual object are decided so that the centroid projection point does not move on the image plane and the distance from the viewpoint to the centroid is proportional to the distance from the viewpoint to the centroid projection point, and the relative relations between the orientation of the virtual object and the orientation of the image plane are kept constant. When the user, under the condition of the object manipulation button 15 untouched, moves the liquid crystal display 11 so that the virtual object desired to be manipulated is projected to the position on which the pointer is located, presses the object manipulation button 15 to select the virtual object, and then moves the liquid crystal display 11 under the condition of the object manipulation button 15 being depressed, the position and orientation of the virtual object can be changed.

Figure 10A:
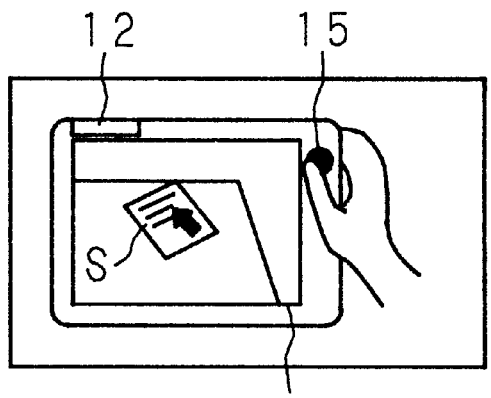
FIGS. 10A–10C are schematic views to show an example of the user manipulation procedures in the present invention.
Figure 10B:
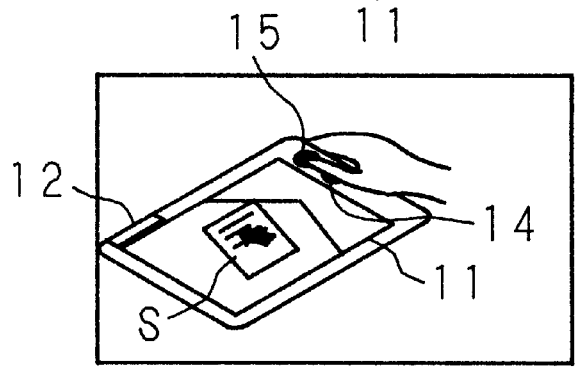
Figure 10C:
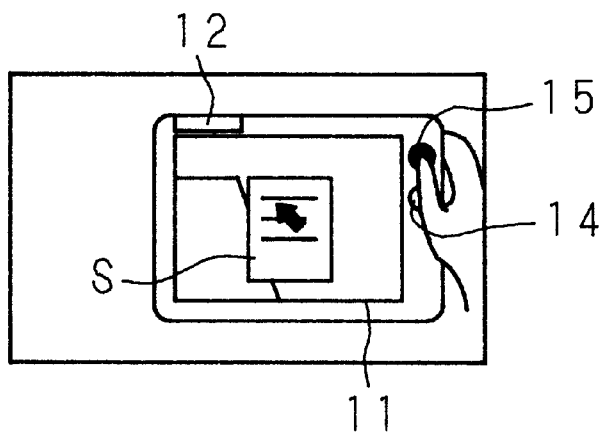

As a concrete example, with respect to the operation to direct the document S placed on a desk in a virtual world, explanation is given by referring to FIGS. 10A–10C which show the manipulation procedures of the user in the operation. FIGS. 10A–10C show the change in the user's visual field in time. First, without depressing the object manipulation button 15, the liquid crystal display 11 is moved to search where the desired document S is. When the document S is found, the pointer on the liquid crystal display 11 is set to the position of the document S (FIG. 10A). Thereafter, the orientation of the liquid crystal display 11 is adjusted to make the orientation of the liquid crystal display 11 and the orientation of the document S presented on the screen equal in appearance, whereupon the object manipulation button 15 is pressed to select the document (FIG. 10B). And, with the object manipulation button 15 kept in depression, the liquid crystal display 11 is directed to the front, and the document S in the virtual world is presented under the condition oriented to the front face (FIG. 10C). Conventionally, complicated calculation has been necessary with detection of the angle of the document and the like, but according to the present invention the manipulations to the document S can be performed quite intuitively.

To each object in the virtual world, restrictions are set in advance in movements such as "movable along certain plane only", "certain axis is always oriented to a certain direction", etc. Accordingly, when the user intends to move the virtual object in excess of the designated limit, the virtual object is moved under re-interpretation to the movements within the limited range. For example, in the case of placing a cup on the table, even if the user intends to move the cup to a position under the table plane, the cup is not imbedded in the table surface but the cup moves on the table plane under interpretation as being the 2-D movement on the table plane. Further, by limiting the movement of an automobile to the 2-D movement on the ground, and limiting the movement of a train to the 1-D movement on a rail, more reality can be expressed.

Now, by presenting the following secondary changes along with the changes of the position and orientation of an object in the virtual world, realistic feeling is more emphasized. For example, setting is so made that, in decanting a water-containing glass, when decanted slowly, water flows out quietly from the glass, but when quickly decanted, water flows out vigorously from the glass. Also, in moving a mirror, the scenes reflecting on the mirror are also dynamically formed and presented. Furthermore, in moving the illumination instruments, the condition of the scenes surrounding them is changed according to the movement of the instruments.

Furthermore, when the virtual world provider gives a thoroughgoing secondary effect to a certain virtual object, the user may use the said virtual object as a tool. For example, when the user selects an engraving knife by an object manipulation button 15 and manipulates the virtual engraving knife by moving the liquid crystal display 11, engraving can be performed in the virtual world.

(Embodiment 2)

Figure 11:
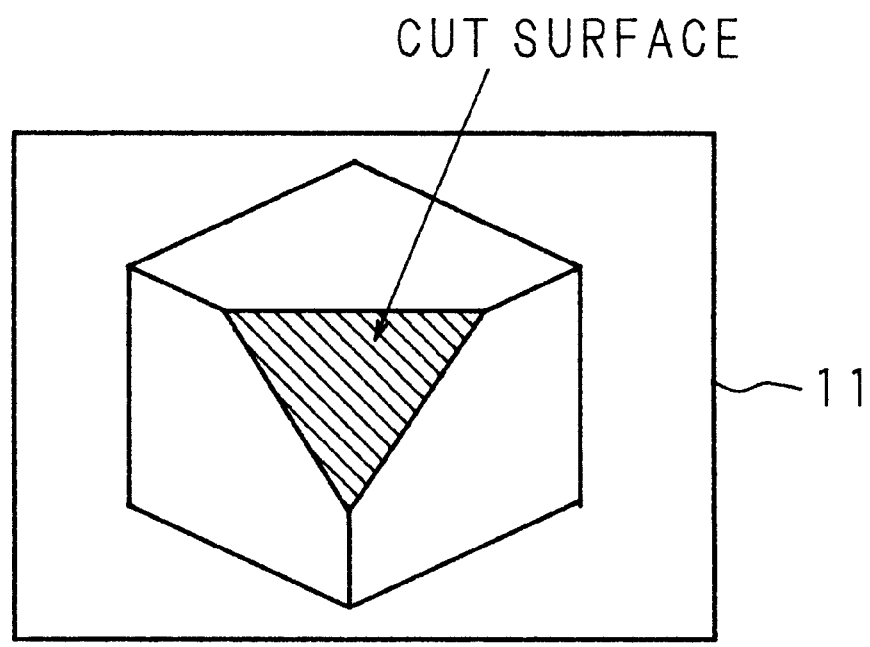
FIG. 11 is a view to show a presentation example of the cut surface of an object.

Next, an example of the terminal suitable for the medical image processing is explained. The constitution and basic usage of the apparatus are to be similar to those of Embodiment 1. However, the projection objective regions in the projection means 4 are limited to the opposite volume to the viewpoint and the image plane, and no projection is made to the portion of the same volume as the viewpoint. By this setting, when the image plane passes the inside of the subjective virtual object, an image of said virtual object cut at said plane can be obtained. A presentation example of a cubic virtual object cut is shown in FIG. 11. By so arranging, for example, when the applicable object is a brain, when the liquid crystal display 11 is positioned with distance, the appearance of the brain is presented, but when the liquid crystal display is brought near, the cross-section of brain comes to be seen.

In the conventional cut face presentation method, it is necessary to adjust the parameters on the position and orientation of the cut face independently. However, according to this Embodiment 2, it becomes possible to make minute adjustments intuitively of many parameters simultaneously. Also, when this system is used, the internal structures of objects having complicated 3-D configuration can be expressed in the applications other than the medical field as well.

(Embodiment 3)

Next, an example of using the wide screen 2-D GUI in the portable terminals is given. By this system it is possible to use, not the user interface specialized for the portable terminals but the standard GUI. That is to say, by considering an extensive 2-D GUI plane in a virtual 3-D world and "looking into" it by using a mobile display, scrolling of GUI plane and its enlargement/contraction can be intuitively practiced.

With respect to the mobile display 1, there is used a flat type liquid crystal display which is small enough to be freely manipulated manually by the user. With respect to the display position/orientation detection means 5, photographing of image by the CCD camera fixed to the display is made, and using the image analysis technique such as computation of optical flow, tracking of a standard object or the user's face, the position and orientation of the display in the real world are detected. In the virtual object selection means 9, the mouse pointer on the GUI screen is selected at all times. In the virtual object position/orientation decision means 10, the position and the orientation are determined so that the mouse pointer always moves on the 2-D GUI plane and its projection point does not move on the image plane. On the mobile display 1 a button having the same function as that of the mouse button is provided so that said button can be pressed upon necessity for pressing the mouse button.

(Embodiment 4)

Figure 12:
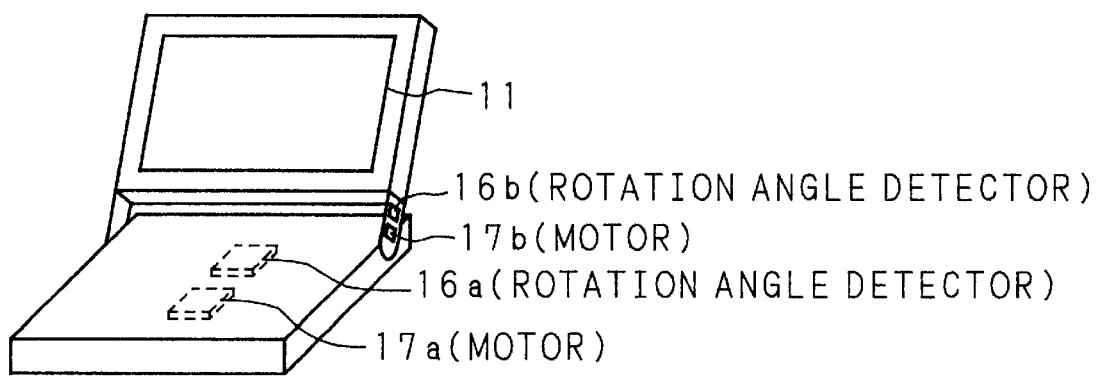
FIG. 12 is a schematic view of the rotation limitation type terminal apparatus according to the present invention.

Next, an explanation is given on the case where the movement of the mobile display is limited to rotation. The movable range of the mobile display is limited to the rotation in a horizontal direction and the rotation in a vertical direction. FIG. 12 is a schematic view of the terminal apparatus of this Embodiment 4. This terminal apparatus is like a notebook-sized personal computer, and comprises a liquid crystal display 11 as a mobile display 1, rotation angle detectors 16a, 16b such as variable resistors for detecting the rotation angles in the horizontal direction and in the vertical direction, respectively, of the liquid crystal display 11, and motors 17a, 17b for controlling the rotation angles in the horizontal direction and in the vertical direction, respectively, of the liquid crystal display 11. The rotation angle detectors 16a, 16b are used as the display position/orientation detection means 5, and the motors 17a, 17b are used as the display position/orientation control means 6.

The viewpoint/image plane decision means 3 always keep the position of the viewpoint at a position in front of the liquid crystal display 11 and distant by a predetermined amount. When the user directly manipulates the liquid crystal display 11, the position and orientation of the image plane is decided according to the position and orientation detected by the display position/orientation detection means 5 (rotation angle detectors 16a, 16b). Also, When the user indirectly manipulates the liquid crystal display 11 through the auxiliary input device, or, when the liquid crystal display 11 is moved in tune with the event of the virtual world, the position and orientation of the image plane are decided according to the control signal to be used in the display position/orientation control means 6 (motor 17a, 17b).

In Embodiment 4, panoramic display of bird's eye view and looking around of the virtual objects existing in the vicinity of the image plane are feasible, i.e., for example, images obtainable by looking around a pot, a vase, etc. from various angles can be presented.

(Embodiment 5)

Next, an example of a globe type terminal apparatus is illustrated. In this terminal apparatus, an image showing as if a specified virtual object were rotated can be presented.

In the mobile display 1, instead of the globe, a spherical screen is disposed, wherein an image is presented with a liquid crystal projector. In the projection means 4, in consideration of the position of the liquid crystal projector and the position and configuration of the spherical screen, the images are formed so that a part of the virtual world can be seen without distortion from the position of the viewpoint. In the viewpoint image plane decision means 3, the position of the viewpoint is kept constant. In the display position/orientation detection means 5, using the rotation angle detector such as a variable resistor, the rotation angle of the spherical screen in the horizontal direction and the vertical direction are detected. In the virtual object selection means 9, a virtual object is selected at all times. In the virtual object position/orientation decision means 10, the centroid of the previously set virtual object is positioned at the center of the spherical image plane, and the position and orientation of the virtual object are decided so as to keep the relative relations between the orientation of said virtual object and the orientation of the spherical image plane constant.

(Embodiment 6)

Figure 13:
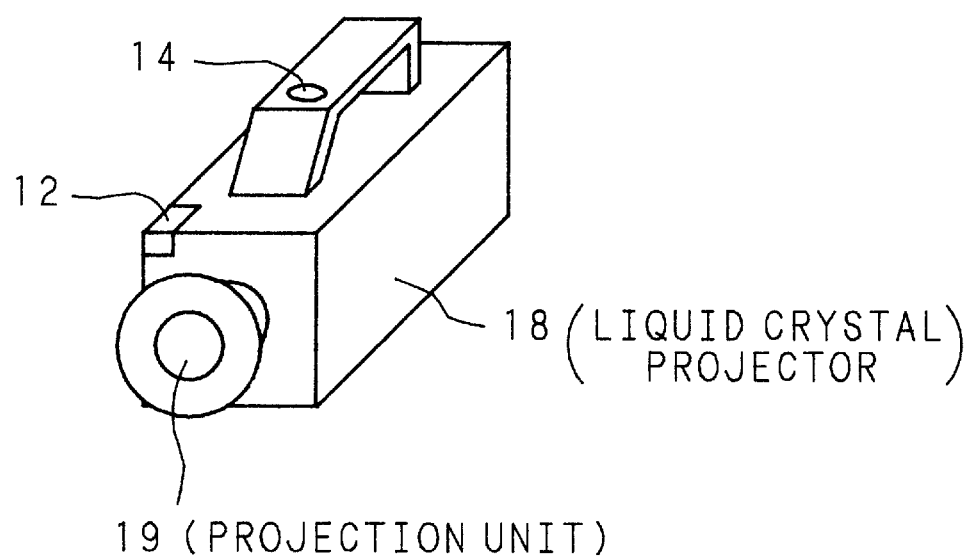
FIG. 13 is a schematic view of a virtual spotlight type terminal apparatus according to the present invention.

Next, an example of the virtual spotlight type terminal apparatus is explained. In this terminal apparatus, an image showing as if the virtual world were lit with a spotlight can be presented. FIG. 13 is a schematic view of the terminal apparatus according to this Embodiment 6. As the mobile display 1, there are used a liquid crystal projector 18 of a size that can be freely manipulated manually by the user and having a projection unit 19 and a screen fixed in the real world (not illustrated). As the display position/orientation detection means 5, a magnetic sensor 12 set in the liquid crystal projector 18 and a magnetic-dipole transmitter fixed at a point in the real world (not illustrated) are used. Further, on the liquid crystal projector 18 a viewpoint change button 14 is provided.

The subjective regions of projection in the projection means 4 are all regions including the same volume as the viewpoint, the opposite volume to the viewpoint, and the image plane per se. In the viewpoint/image plane decision means 3, based on the position of the screen, the position and orientation to which the image from the liquid crystal projector 18 is projected are computed based on the position of the screen, and the position and orientation of the image plane are decided to make the values equal to the computation results.

And, in the viewpoint/image plane decision means 3, when the viewpoint change button 14 is not depressed, the position of the viewpoint is kept constant. The constant position of the viewpoint in this case is right above the liquid crystal projector 18 with a distance by a predetermined amount at the start of use of the terminal apparatus, and the position of the viewpoint at the time of the last release of the viewpoint change button 14 in any other case. When the user, under the condition of the viewpoint change button 14 untouched, manipulates the liquid crystal projector 18 so as to illuminate the position to which attention is desired to be directed while keeping the own viewpoint unmoved, the user can simulate to look around the virtual world of the related part through the peep hole.

On the other hand, in the viewpoint/image plane decision means 3, when the viewpoint change button 14 is depressed, setting is made to keep the relative positional relations between the position of the viewpoint and the position and orientation of the image plane constant. The user can change the position of the viewpoint in the virtual world by manipulating the liquid crystal projector 18 to illuminate a position to which the attention is desired to be directed, while fixing the relative positional relationship between the liquid crystal projector 18 and the own viewpoint under the condition of the viewpoint change button 14 being depressed.

In the virtual object selection means 9, not the specified virtual object but the spotlight in the virtual space is always selected. In the virtual object position/orientation decision means 10, the position and orientation of the spotlight are made to agree with the position and orientation of the liquid crystal projector 18. The illumination condition is based on the light being cast from the virtual spotlight.

(Embodiment 7)

Next, there is shown an application example of the image presentation to the user. By movement of the mobile display 1 in tune with the image story by the image provider, the position of the viewpoint and the orientation of the view on the image receiver side (user) can be led to the optimum level.

With respect to the display position/orientation control means 6, an arm device with which the angle of each joint is controllable by a motor is used. The viewpoint/image plane decision means 3 is to keep the relative positional relations between the position of the viewpoint and the position and orientation of the image plane constant. In receiving the image, the user can bring the position of the own viewpoint to a position in front of the mobile display 1 with separation at a certain distance, thereby making the position of the viewpoint and viewpoint orientation optimum to the image.

(Embodiment 8)

Next, explanation is given on the embodiment of a virtual elevator scene using an elevator as a mobile vehicle. When the landscapes of various places in the world or the scenes of fantastic virtual world are presented on a mobile display 1 set on an elevator wall in tune with the vertical movements of the elevator, the user who is on an elevator can enjoy the scenery. In case of the high speed elevator in an ultra-high storied building in which no window can be provided, the speed of the elevator can be realized from the change of the scenery presented on the mobile display 1.

The information on the orientation and position of the mobile display 1 to be necessitated in the viewpoint/image plane decision means 3 can be calculated by measuring the the acceleration rate of the elevator with an accelerometer which serves as the display position/orientation detection means 5, or directly inputted by an input device which serves as the display position/orientation setting means 7 by a guide in tune with the operation of the elevator, or made by utilizing a control signal of the elevator in the elevator drive system which serves as the display position/orientation control means 6. In the viewpoint/image plane decision means 3, the position of the viewpoint is set to the point apart by an appropriate distance from the front of the mobile display 1, and the position and orientation of the image plane are made to agree with the position and orientation of the mobile display 1.

In the same manner as in the presentation example of the virtual scenery with the elevator as described above, a mobile display 1 may be disposed on the wall of the vehicle or train in an amusement park and the image of the scenery presented in tune with the movement of the vehicle, thereby giving a feeling as if the vehicle were moving in the virtual world.

(Embodiment 9)

Next, an example of the newspaper browsing terminal is shown. The system constitution is that the function to store the position of the viewpoint and the position and orientation of the image plane at every moment is added to the constitution of the miniature virtual reality terminal shown in Embodiment 1. The related information is stored in the internal memory of the viewpoint/image plane decision means 3.

It is assumed that a virtual newspaper in which the articles are arranged so that the letters used in a headline, lead and text are decreasing in size in this order is posted in a virtual 3-D world. The user looks into the virtual newspaper through this newspaper browsing terminal. When the user separates the image plane from the newspaper to bring the viewpoint nearer and looks into the wide range by moving the liquid crystal display 11, the user can skim through the headline and lead, while when the user alienates the image plane from the viewpoint and brings it closer to the newspaper to look into the narrow range, the user can read the text letters in high resolution.

The loci between the position of viewpoint and the position and orientation of the image plane to be stored during the execution of browsing represent the history of records where the user intended to direct attention in the virtual world. By collating these loci with the arrangements of articles in the newspaper, calculation can be made to what level and how long time the user read the articles. Based on the values obtained, to what extent the user had interest in the respective articles are quantitatively presumed, and the data are stored as interest values in association with the related articles. And, by utilizing the interest values, it becomes possible to display detailed comments by selecting the articles of high interest or to search only the articles of the field of high interest.

(Embodiment 10)

Next, there is shown an example of the virtual reality terminal with binocular stereoscopic function. This is a constitution of a virtual reality terminal shown in Embodiment 1 additionally incorporated with a binocular stereographic image presentation procedure such as a liquid crystal shutter system or anaglyph system.

The viewpoint/image plane decision means 3 have internal memories for storing the two positions of the viewpoint for the right eye and that for the left eye. With respect to each of the right eye and the left eye, the position of the viewpoint is decided at every moment in the same manner as in Embodiment 1, the virtual world seen from the respective position of the viewpoint is projected on the image plane, and the resulting two images are presented as stereographic images on a mobile display 1. The user utilizes this terminal while moving the head so as to bring the own two eyes to those two positions of the viewpoints. A straight line is set, the straight line passing a preset point separate by a predetermined amount in front of the mobile display 1 and running in parallel with the upper and lower sides of the mobile display 1. The two positions of the viewpoints at the start of using the terminal are to be positions which are on the straight line and are separate to right and left respectively by a predetermined amount from the preset point. The distance between the right and left viewpoints requires to be adjusted so as to agree with the distance between the right and left eyes of the individual user.

When the virtual reality terminal having the binocular stereoscopic function as above is used, further improvement in the stereographic showing of an object in the virtual world can be expected by the synergistic effect of the motion parallax and the binocular stereoscopic vision.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image presentation apparatus comprising:

a storage device storing a three-dimensional image;

a display having a position and orientation which are variable;

a projecting device projecting the three-dimensional image stored in the storage device on a two-dimensional image plane, to thereby obtain a two-dimensional image, a viewpoint being independent of a position and orientation of the image plane; and a decision device deciding a position of the viewpoint and the position and orientation of the image plane at the time of the projection by the projecting device according to the position and orientation of the display, the two-dimensional image being displayed on the display, wherein after the position of the viewpoint is initially decided, the position and orientation of the image plane are decided in accordance with the position and orientation of the display, and then the position of the viewpoint is decided so as to keep the position of the viewpoint constant.

2. An image presentation apparatus comprising:

a storage device storing a three-dimensional image;

a display having a position and orientation which are variable;

a projecting device projecting the three-dimensional image stored in the storage device on a two-dimensional image plane, to thereby obtain a two-dimensional image, a viewpoint being independent of a position and orientation of the image plane; and a decision device deciding a position of the viewpoint and the position and orientation of the image lane at the time of the projection by the projecting device according to the position and orientation of the display, the two-dimensional image being displayed on the display, wherein, after the position of the viewpoint is initially decided independently from the position and orientation of the image plane, the position and orientation of the image plane are decided in accordance with the position and orientation display, and then the position of the viewpoint is decided so as to keep the relative positional relation between the viewpoint and the image plane constant.

3. The image presentation apparatus according to claim 1, further comprising:
    a detector detecting the position and orientation of the display, wherein the decision device decides the position of the viewpoint and the position and orientation of the image plane according to results of detection by the detector.

4. The image presentation apparatus according to claim 1, further comprising:
    a controller controlling the position and orientation of the display in accordance with a control signal, wherein the decision device decides the position of the viewpoint and the position and orientation of the image plane in accordance with the control signal.

5. The image presentation apparatus according to claim 1, further comprising:
    a setting device setting the position and orientation of the display, wherein the decision device decides the position of the viewpoint and the position and orientation of the image plane according to the position and orientation of the display set by the setting device.

6. The image presentation apparatus according to claim 1, further comprising:
    a mobile vehicle carrying the display, wherein the decision device decides the position of the viewpoint and the position and orientation of the image plane according to the position and orientation of the display and a position and orientation of the mobile vehicle.

7. The image presentation apparatus according to claim 1, wherein the three-dimensional image includes a plurality of objects, the apparatus further comprising:
    a selector selecting an object out of the plurality of objects; and
    a deciding device deciding a position and orientation of the object selected by the selector according to the position of the viewpoint and the position and orientation of the image plane decided by the decision device.

8. An apparatus comprising:
    a display having a position and orientation which are variable;
    a position determining device determining a position of a viewpoint and a position and orientation of a two-dimensional image plane according to the position and orientation of the display, the position of the viewpoint being independent of the position and orientation of the image plane; and
    a projector projecting a three-dimensional image on the image plane in accordance with the position of the viewpoint and the position and orientation of the image plane determined by the position determining device, to thereby produce a two-dimensional image which is displayed on the display,
    wherein, after the position of the viewpoint is initially decided, the position and orientation of the image plane are decided in accordance with the position and orientation of the display, and then the position of the viewpoint is decided so as to keep the position of the viewpoint constant.

9. An apparatus comprising:
    a display having a position and orientation which are variable;
    a position determining device determining a position of a viewpoint and a position and orientation of a two-dimensional image plane according to the position and orientation of the display, the position of the viewpoint being independent of the position and orientation of the image plane; and
    a projector projecting a three-dimensional image on the image plane in accordance with the position of the viewpoint and the position and orientation of the image plane determined by the position determining device, to thereby produce a two-dimensional image which is displayed on the display,
    wherein, after the position of the viewpoint is initially decided independently from the position and orientation of the image plane, the position and orientation of the image plane are decided in accordance with the position and orientation of the display, and then the position of the viewpoint is decided so as to keep the relative positional relation between the viewpoint and the image plane constant.

10. The image presentation apparatus according to claim 2, further comprising:
    a detector detecting the position and orientation of the display, wherein the decision device decides the position of the viewpoint and the position and orientation of the image plane according to results of detection by the detector.

11. The image presentation apparatus according to claim 2, further comprising:
    a controller controlling the position and orientation of the display in accordance with a control signal, wherein the decision device decides the position of the viewpoint and the position and orientation of the image plane in accordance with the control signal.

12. The image presentation apparatus according to claim 2, further comprising:
    a setting device setting the position and orientation of the display, wherein the decision device decides the position of the viewpoint and the position and orientation of the image plane according to the position and orientation of the display set by the setting device.

13. The image presentation apparatus according to claim 2, further comprising:
    a mobile vehicle carrying the display, wherein the decision device decides the position of the viewpoint and the position and orientation of the image plane according to the position and orientation of the display and a position and orientation of the mobile vehicle.

14. The image presentation apparatus according to claim 2, wherein the three-dimensional image includes a plurality of objects, the apparatus further comprising:
    a selector selecting an object out of the plurality of objects; and
    a deciding device deciding a position and orientation of the object selected by the selector according to the position of the viewpoint and the position and orientation of the image plane decided by the decision device.

* * * * *

UNITED STATES PATENT AND TRADEMARK OFFICE
CERTIFICATE OF CORRECTION

PATENT NO.:     6,084,594
DATED      :    July 4, 2000
INVENTOR(S):    Makoto GOTO It is certified that errors appear in the above-identified patent and that said Letters Patent is hereby corrected as shown below:

On the title page: Item
[56]    References Cited

Change "5,841,439   11/1998" to
        --5,841,439   1/1998--

Signed and Sealed this

Twenty-fourth Day of April, 2001

Attest:

NICHOLAS P. GODICI

Attesting Officer      Acting Director of the United States Patent and Trademark Office